(12) United States Patent
Molascon

(10) Patent No.: US 11,912,210 B2
(45) Date of Patent: Feb. 27, 2024

(54) SPACE-SAVING BROADBAND RESONATOR HAVING A RESONATOR INSERT

(71) Applicant: MANN+HUMMEL GmbH, Ludwigsburg (DE)

(72) Inventor: Timothy Molascon, Kalamazoo, MI (US)

(73) Assignee: MANN+HUMMEL GmbH, Ludwigsburg (DE)

( * ) Notice: Subject to any disclaimer, the term of this patent is extended or adjusted under 35 U.S.C. 154(b) by 220 days.

(21) Appl. No.: 17/485,885

(22) Filed: Sep. 27, 2021

(65) Prior Publication Data

US 2023/0102336 A1  Mar. 30, 2023

(51) Int. Cl.
| | |
|---|---|
| *F01N 1/02* | (2006.01) |
| *F02M 35/12* | (2006.01) |
| *B60R 13/08* | (2006.01) |
| *G10K 11/16* | (2006.01) |
| *G10K 11/172* | (2006.01) |

(52) U.S. Cl.
CPC .......... *B60R 13/0846* (2013.01); *F01N 1/026* (2013.01); *F02M 35/1266* (2013.01); *F02M 35/1283* (2013.01); *G10K 11/161* (2013.01); *G10K 11/172* (2013.01)

(58) Field of Classification Search
CPC ........... F02M 35/1255; F02M 35/1261; F02M 35/1266; F02M 35/1283; F01N 1/026
USPC ......................................................... 181/229
See application file for complete search history.

(56) References Cited

U.S. PATENT DOCUMENTS

| | | | |
|---|---|---|---|
| 8,360,199 B2 * | 1/2013 | Miller | F02M 35/1272 123/184.21 |
| 2002/0029927 A1 | 3/2002 | Spannbauer et al. | |
| 2012/0222641 A1 | 9/2012 | Mackenzie et al. | |
| 2016/0238175 A1 * | 8/2016 | Barbolini | F16L 55/052 |
| 2018/0245554 A1 * | 8/2018 | Shin | F02M 35/1216 |
| 2020/0141372 A1 * | 5/2020 | Choi | F02M 35/1211 |

(Continued)

FOREIGN PATENT DOCUMENTS

| | | | | |
|---|---|---|---|---|
| CN | 107514325 A | * | 12/2017 | |
| CN | 112081694 A | * | 12/2020 | ......... F02M 35/1266 |
| CN | 112555072 A | * | 3/2021 | |

(Continued)

OTHER PUBLICATIONS

English translation of KR-20170142580-A, accessed Jun. 28, 2023 via USPTO search tool (Year: 2017).*

(Continued)

*Primary Examiner* — Jeremy A Luks

(57) ABSTRACT

A space-saving broadband resonator configured to install within and utilize inner space of other components and includes a resonator insert having a tubular pipe elongated along a central axis, the tubular pipe having a circumferential outer wall having a plurality of perforation holes spaced apart and extending radially through the circumferential outer wall. An interior of the tubular pipe forms a gas flow duct. A plurality of annular disk-shaped walls provided on and projecting radially outwardly from the tubular pipe. Adjacent annular disk-shaped walls spaced axially part from each other define resonator chambers therebetween. A bell mouth is formed at the second axial end of the tubular pipe, the bell mouth flared radially outwardly.

14 Claims, 5 Drawing Sheets

(56) References Cited

U.S. PATENT DOCUMENTS

2020/0408178 A1\* 12/2020 Lee .................. F02M 35/10209

FOREIGN PATENT DOCUMENTS

| DE | 202013011555 U1 | \* | 4/2014 | ............. F02C 7/045 |
| EP | 1408228 A1 | \* | 4/2004 | ........... F02D 9/1035 |
| EP | 1416148 A2 | | 5/2004 | |
| KR | 20170142580 A | \* | 12/2017 | |

OTHER PUBLICATIONS

English translation of CN-112555072-A, accessed Jun. 28, 2023 via USPTO search tool (Year: 2021).\*

\* cited by examiner

SPACE-SAVING BROADBAND RESONATOR HAVING A RESONATOR INSERT

TECHNICAL FIELD

The present invention relates to space-saving broadband noise reducing resonator for an air intake systems of passenger vehicles, motor vehicles, fuel cell vehicles, and off-road equipment.

BACKGROUND OF THE INVENTION

Resonators are known for use in air inductions system and may be applied to reduce the amplitude frequency spectrum of air pulsations. A resonator can be configured to resonate at, suppress or reflect sound waves at one or more frequencies so as to effectively modify the sound characteristics of the air intake system.

Known resonators are separate or additional components air intake system components which compete for the limited installation space or packaging spacing inside the engine compartment or vehicle space in new vehicle designs. Known are resonators that are generally acceptable for their intended purposes. However, in some applications, especially in new vehicle designs, sometimes the required space is not available to for adding a resonator into a design when one is required by the design or the customer, particularly when the available installation or packaging space is very tight or limited.

There remains a need in the resonator prior art for an new effective solution to the packaging space problem in new vehicle designs. Such a solution would fulfill a long felt need.

SUMMARY OF THE INVENTION

A primary objective of the present invention is to provide space-saving broad band resonator which can be incorporated into other air intake system components and thereby reduce or preferably eliminate the need for installation or packaging space, particularly when the available installation or packaging space is very tight or limited.

Another objective of the present invention is to provide a broadband resonator having a resonator insert configured to install into the interior of an air duct system such that a component of the air duct system forms an outer wall which closes off a radially outer circumference of the resonator chambers to form a resonator casing, cooperating with the resonator insert to effectively form a resonator.

Another objective of the present invention is to provide a broadband resonator having a resonator insert having a rotational alignment locking structure configured to engage a projection feature of the air duct system to enforce a desired fixed rotational alignment of the resonator insert.

Another objective of the present invention is to provide a broadband resonator having a resonator insert provided with at least one snap locking tab configured to snap mount the resonator insert in the air duct component forming the resonator casing, to mount the resonator insert at a fix axial position in the air duct component.

The above critical advantages of the inventive disclosure and other critical features are disclosed in description provided herein and in the drawing figures of the present application.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

Figure 1:
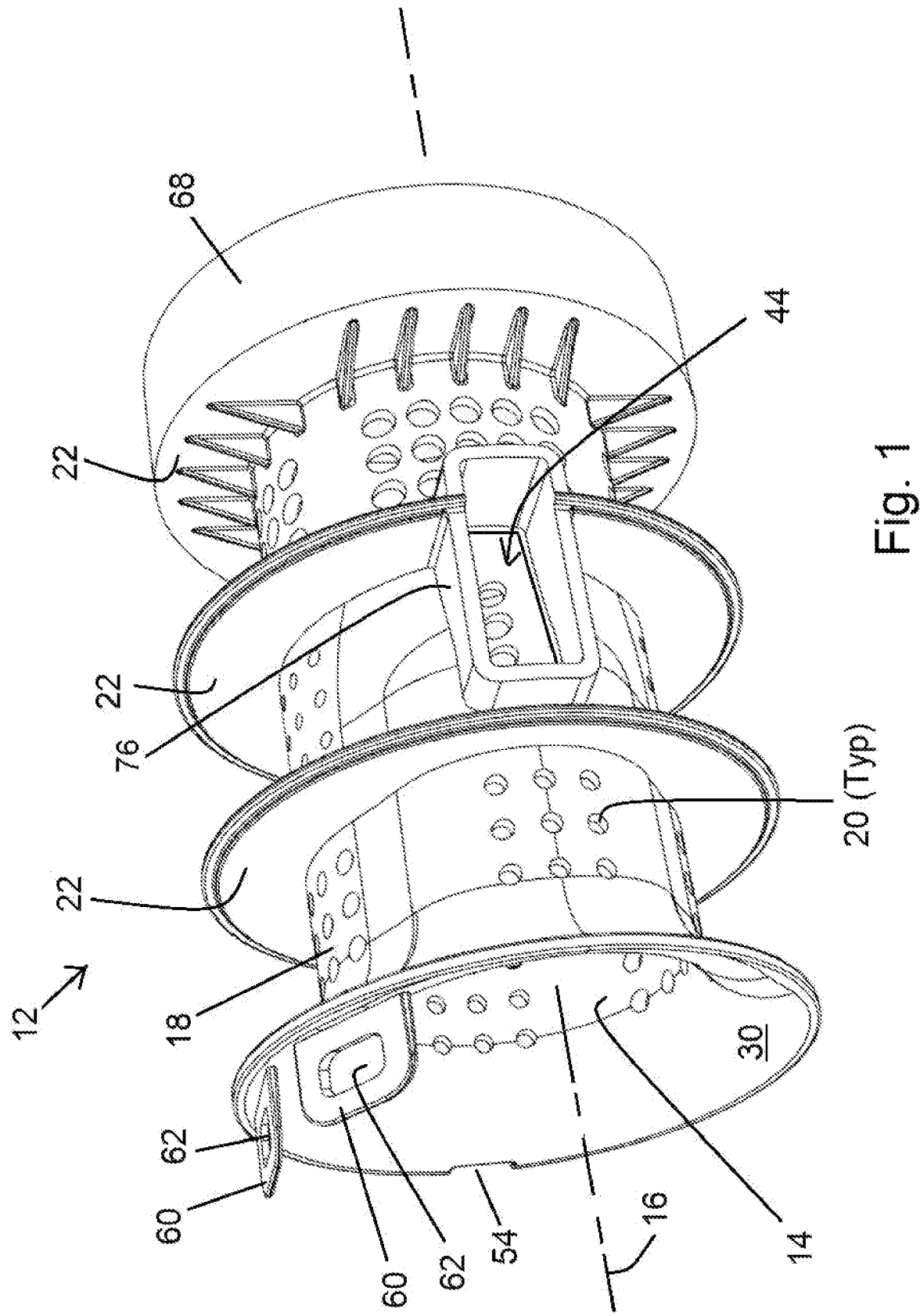
FIG. 1 depicts a side perspective view of a resonator insert of the broadband resonator, consistent with the present inventive disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to a space saving broadband resonator configuration having a resonator insert with radially projecting annular disk shaped walls configured to close against an inner wall of a resonator casing that surrounds the resonator insert. Consistent with the inventive disclosure, an air duct or a portion of an air duct or air inlet or outlet port of a component housing, for example a filter housing, may preferably form the resonator casing. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Figure 2:
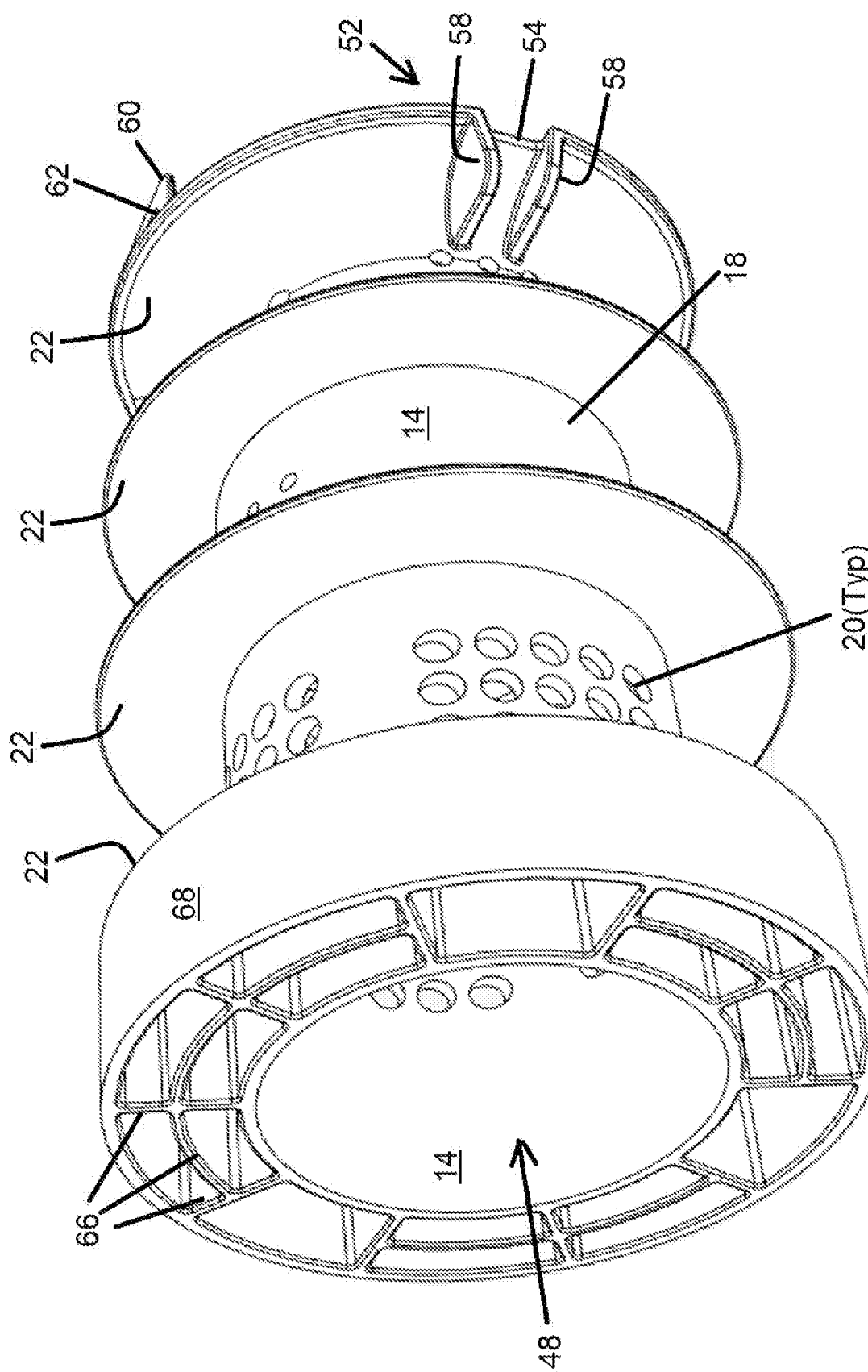
FIG. 2 depicts another perspective view of the resonator insert of the broadband resonator, the view taken at an opposite axial end and side relative to FIG. 1.

FIG. 1 depicts a side perspective view of an example resonator insert 12, consistent with the present inventive disclosure, cooperatively configured to install into the interior of a resonator casing thereby forming together a broadband resonator 10. FIG. 2 depicts another perspective view of the resonator insert of the broadband resonator, the view taken at an opposite axial end and side relative to FIG. 1. The a resonator insert 12 is configured to be received into an interior of an air duct, or at a portion of an air duct, or into an air inlet or outlet port of a housing, for example a filter housing, or into the air inlet or outlet port or in the interior of a filter housing or other component. Advantageously, embodying the broadband resonator in the interior of another present component advantageously reduces or eliminates resonator packaging space, especially in very space limited engine compartments of motor vehicles by "hiding" the resonator in an interior of an already necessary air duct or air filter housing 70 without requiring new/additional installation space.

The resonator insert 12 has tubular pipe 14 which is elongated along a central axis 16 from a first axial end to a second axial end of the broadband resonator insert 10, the tubular pipe 14 having a circumferential outer wall 18 which is provided with a plurality of perforation holes 20 which are spaced apart on the tubular pipe 14 and extend through the circumferential outer wall 18 into the interior 48 of the tubular pipe 14. The interior of the tubular pipe 14 advantageously forms a gas flow duct for guiding a gas flow through the interior of the broadband resonator from the first axial end to the second axial.

A plurality of annular disk-shaped walls 22 are provided on, or preferably formed directly on and in one piece with the circumferential outer wall 18 of the tubular pipe 14 preferably forming a unitary one-piece tubular pipe 14. The annular disk-shaped walls 22 project radially outwardly from the circumferential outer wall 18 of the tubular pipe (14) to contact against an interior of the resonator casing 32. Adjacent annular disk-shaped walls 22 are spaced axially part from each other along a length of the tubular pipe (14) to define a plurality of resonator chambers 24 (for example: 24A, 24B, 24C) therebetween.

As can be seen on FIG. 1 and FIG. 2, preferably a first one of the plurality of the annular disk-shaped walls 22 is arranged proximate to the first axial end 26 of the resonator insert 12. A bell mouth 30 may be formed at the second axial end 28 of the tubular pipe 14, the bell mouth 30 is curved and flared radially outwardly to form a low air flow resistance, low pressure drop flow guiding wall at the second axial end 28.

As can be seen in FIG. 1 and FIG. 2, and later in FIG. 3, the plurality of annular disk-shaped walls 22 each have a different radially outer diameter, so as to close axially against a respective stepped inner wall of the an air duct, or portion of an air duct, or into an air inlet or outlet port of a housing, for example a filter housing, or into the air inlet or outlet port within the interior of a filter housing. The differing diameters are critical to enable leading annular disk-shaped walls 22 to clear steps in the inner wall and to close against the intended respective one of the steps in the inner wall for form separate resonator chambers.

As can be seen best in FIG. 1, the resonator insert 12 of the broadband resonator 10 may include an air flow sensor opening 44 which extending through the circumferential outer wall 18 of the tubular pipe 14 and into the air flow duct formed in the interior of the tubular pipe 14. As can be seen in FIG. 1, the air flow sensor opening 44 may be surrounded by a radially projecting circumferential outer wall 76 configured to surround an air flow sensor and the air flow sensor opening 44 arranged in a spacing between the tubular pipe 14 and the inner wall of the resonator casing 32, i.e.: the air duct, or at portion of an air duct, or into an air inlet or outlet port of a housing, for example a filter housing, or into the air inlet or outlet port within the interior of a filter housing. As shown in FIG. 1, the radially projecting circumferential outer wall 76 may be arranged on and may extend through at least one of the annular disk-shaped walls 22.

As best shown in FIG. 2, the resonator insert 12 includes a rotational alignment locking structure 52 configured to engage with the resonator casing 32 and fix or at least limit rotation of the resonator insert 12 within the resonator casing 32, advantageously to enforce a desired or necessary rotational alignment of the resonator insert 12 within the resonator casing 32. The rotational alignment locking structure 52 may include an indentation 54 formed into a radially outer edge of at least one of the plurality of annular disk-shaped walls 22, the indentation 54 configured to engage a projection feature 56 of the resonator casing 32. The rotational alignment locking structure 52 may further include two axially projecting walls 58, spaced apart circumferentially on the annular disk-shaped wall 22 and proximate to the radially outer edge. The two axially projecting walls 58 may be preferably positioned at opposite sides of the indentation 54 (if the indentation is provided) and may extend downwards on an axial face of the annular disk-shaped wall 22, in a direction away from the indention 54 and towards the tubular pipe 14.

Figure 3:
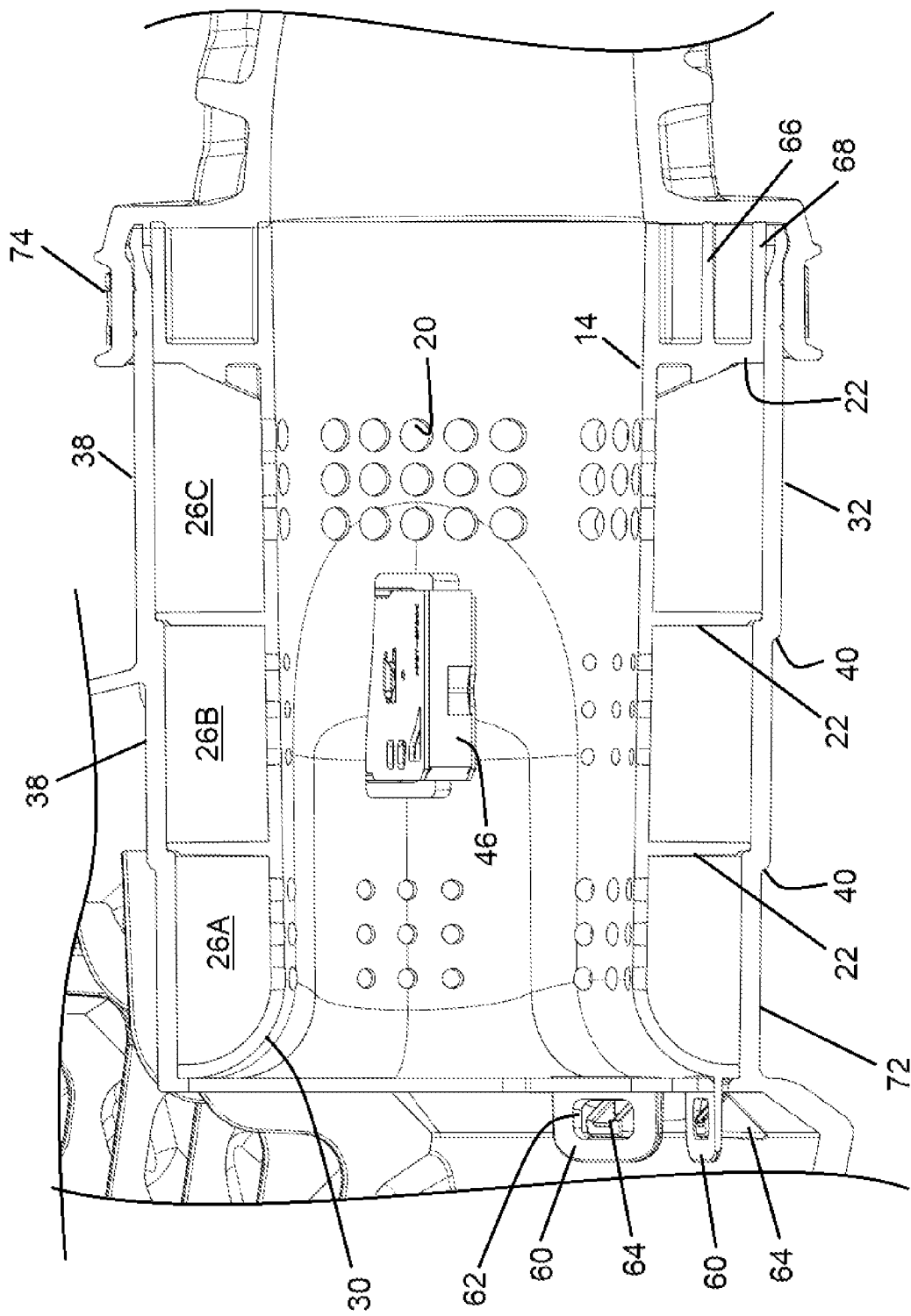
FIG. 3 depicts a sectional view of a broadband resonator having the resonator insert of FIG. 1 and FIG. 2. is installed in an interior of an air duct casing or an air inlet or outlet port casing of a filter housing, consistent with the present inventive disclosure.

As best shown in FIGS. 1 and 3, the resonator insert preferably has at least one snap locking tab 60 formed on and arranged proximate to a radially outer edge of the bell mouth 30. The at least one snap locking tab 60 preferably includes an engagement opening 62 configured to receive a snap projection 64 formed on an inner wall of the resonator casing 32 to axially lock the resonator insert 12 into an installed position within the resonator casing 32.

As best shown in FIG. 2, the resonator insert 12 at the first one of the plurality of disk-shaped annular walls may advantageously include a rib structure 66 formed on and projecting axially outward on the first one of the plurality of disk-shaped annular walls, the rib structure has radially projecting ribs and may have circumferential ribs, the ribs contacting against the configured to carry radially compressive clamp loading from a circumferential outer rim 68 of the first one of the plurality of disk-shaped annular walls (for example see the FIG. 3 clamp 74 loading the circumferential outer rim 68 of FIG. 2).

As shown in FIG. 3, the plurality of annular disk-shaped walls 22 each have a different radial outer diameter, so a to close axially against the an intended stepped inner circumferential wall 38 of the an air duct, or at portion of an air duct, or into an air inlet or outlet port of a housing, for example a filter housing, or into the air inlet or outlet port within the interior of a filter housing. The differing diameters are critical to enable leading annular disk-shaped walls 22 to clear steps 40 formed in the inner circumferential wall 38 by abrupt changes in diameter of the inner circumferential wall 38 along the axial length of the inner circumferential wall 38. The plurality of annular disk-shaped walls 22 are sized and configured to close axially against the steps to separate the annular space between the tubular pipe 14 and the stepped inner circumferential wall 38 in to a plurality of separate resonator chambers (for an illustrating example, resonator chambers 26A, 26B and 26C shown in FIG. 3). Depending on the frequency bands to be attenuated and resonator chambers required, the resonator insert may have any number of annular disk-shaped walls 22.

Figure 4:
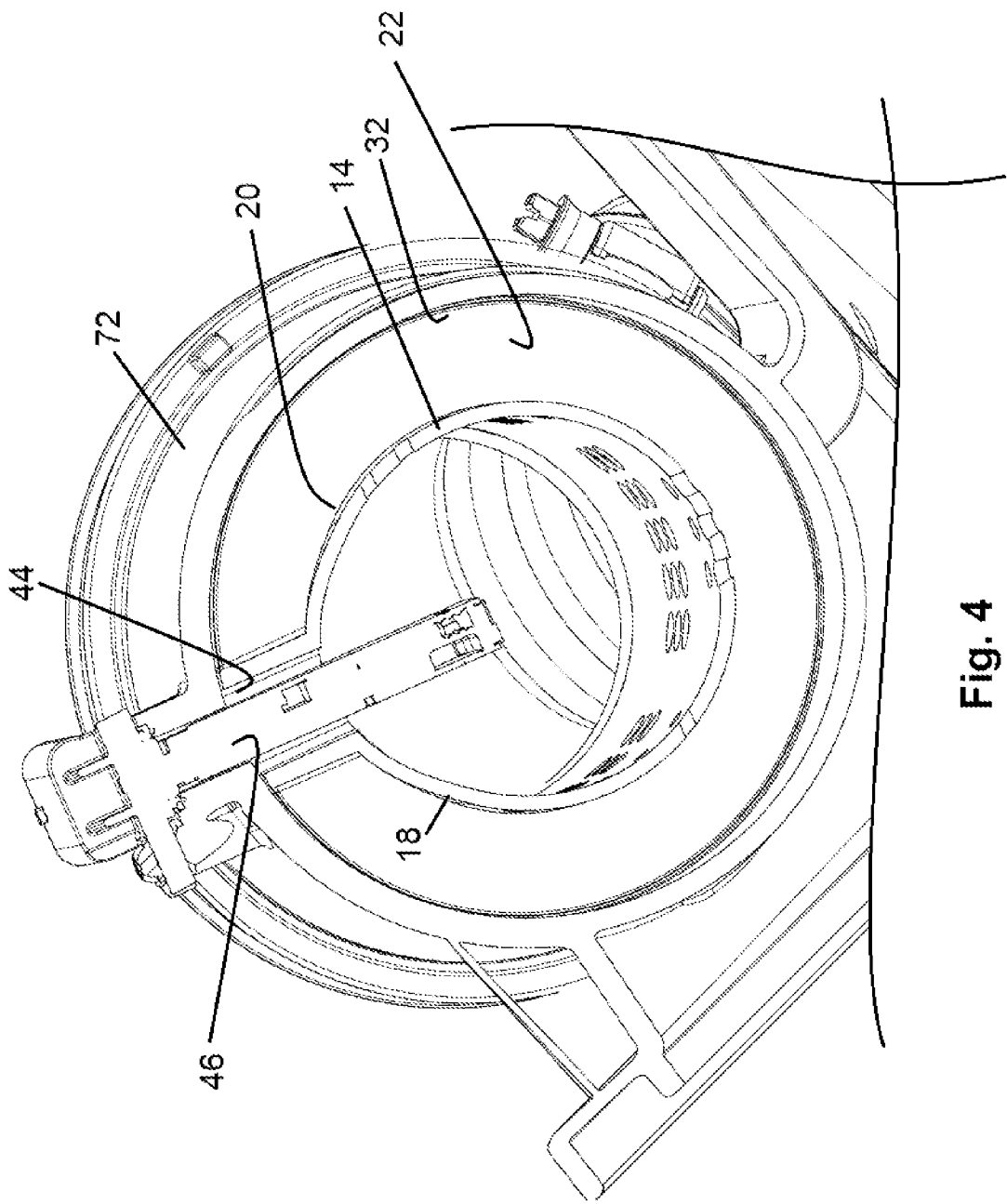
FIG. 4 is a radial cross-sectional view of the broadband resonator, consistent with the present inventive disclosure, section taken at the mass air flow sensor.

FIG. 4 shows a radial cross-sectional view of the broadband resonator, taken art the air flow sensor opening 44 FIG. 1, depicting the mass air flow sensor 46 projecting through the air flow sensor opening 44 and into the interior of the tubular pipe 14.

Figure 5:
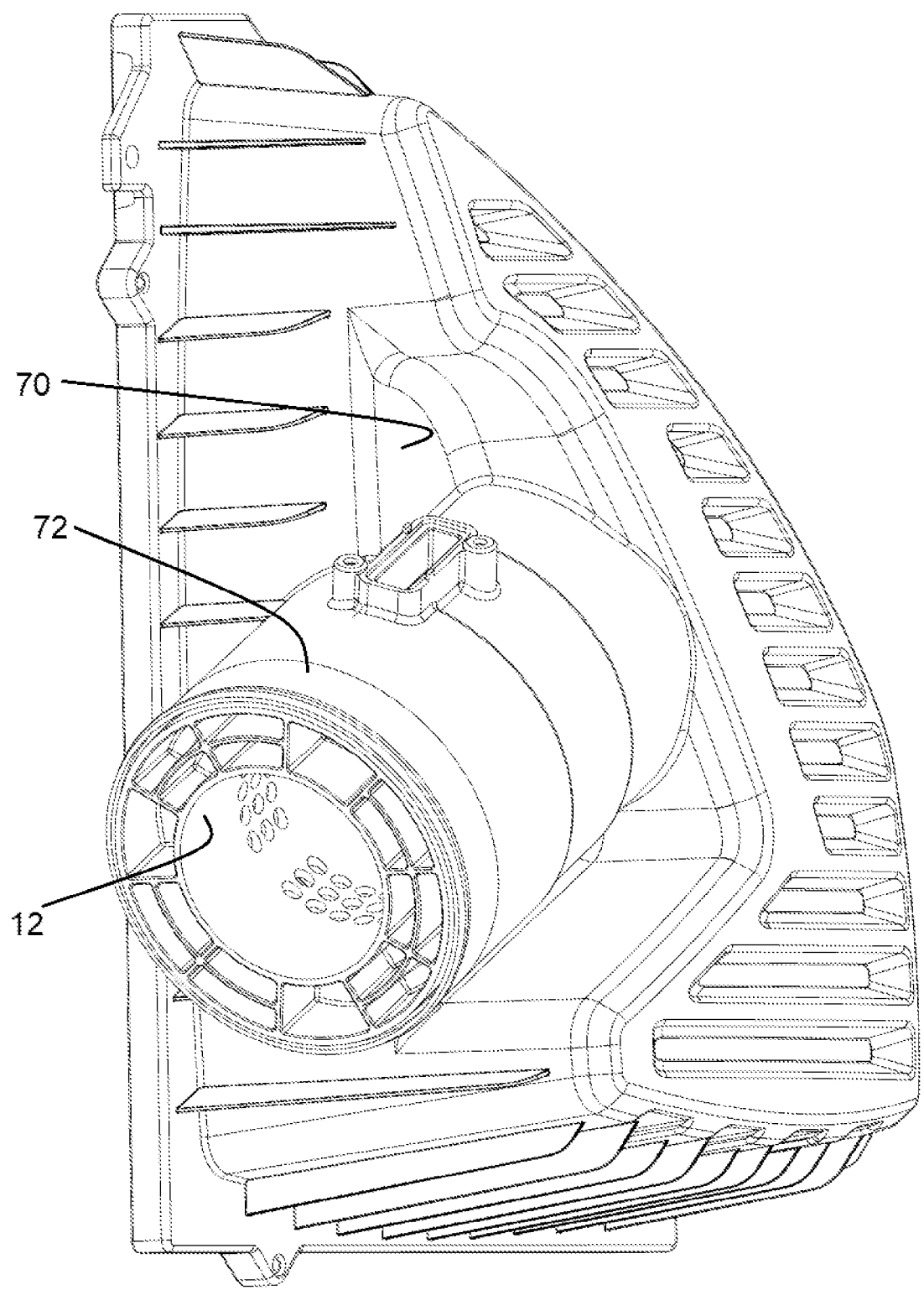
FIG. 5 depicts a perspective view of a filter housing showing the broadband resonator formed by and within the filter housing with the resonator insert of FIG. 1 installed within the filter housing, according to a preferred aspect of the invention.

FIG. 5 depicts a perspective view of a housing, for example a filter housing, showing the broadband resonator 10 formed within the filter housing 70 with the resonator insert 12 of FIG. 1 installed within an interior of the air inlet or air outlet port 72 of the filter housing 70.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A broadband resonator, comprising:
a resonator insert configured for installation into an interior of an air duct casing or an air inlet or outlet port casing of a filter housing, the resonator insert comprising:
  a tubular pipe elongated along a central axis from a first axial end to a second axial end of the broadband resonator insert, the tubular pipe having a circumferential outer wall having a plurality of perforation holes spaced apart and extending radially through the circumferential outer wall,
  wherein an interior of the tubular pipe forms a gas flow duct for guiding a gas flow through the broadband resonator from the first axial end to the second axial end;
  a plurality of annular disk-shaped walls provided on and projecting radially outwardly from the circumferential outer wall of the tubular pipe, adjacent ones of the annular disk-shaped walls spaced axially part from each other to define resonator chambers therebetween;
  wherein a first one of the plurality of the annular disk-shaped walls is arranged proximate to the first axial end of the resonator insert;
  wherein a bell mouth is formed at the second axial end of the tubular pipe, the bell mouth flared radially outwardly;
a resonator casing formed in an interior of an air duct, or by the air duct or in a filter housing air inlet port or air outlet port, the resonator casing having an interior chamber configured to receive the resonator insert, the resonator casing comprising:
  a resonator insert receiving chamber radially outwardly delimited by a stepped circumferential wall;
  wherein the stepped circumferential wall forms one or more steps, the steps formed by an abrupt change in inner diameter of the stepped circumferential wall;
  wherein the one or more steps are positioned to close against an axial outer side of a respective one of the plurality of the annular disk-shaped walls of the resonator insert, the steps cooperating with the respective annular disk-shaped wall to divide an annular volume of the resonator insert receiving chamber surrounding the tubular pipe into separate resonator chambers;
  wherein the steps and the plurality of annular disk-shaped walls are positioned such that when the resonator insert is fully received into the resonator insert receiving chamber, the steps close against its respective annular disk-shaped wall of the resonator insert;
  wherein the resonator insert further includes:
    an air flow sensor opening extending through the circumferential outer wall of the tubular pipe, the air flow sensor opening configured to receive a mass air flow sensor through the air flow sensor opening and projecting into the gas flow duct in the interior of the tubular pipe; and
    a radially outward projecting circumferential outer wall formed on the tubular pipe and surrounding the air flow sensor opening.

2. The broadband resonator according to claim 1, wherein the plurality of annular disk-shaped walls each have a different radially outer diameter;
wherein the plurality of annular disk-shaped walls are spaced apart axially on the circumferential outer wall of the tubular pipe;
wherein the plurality of annular disk-shaped walls each have an outer diameter, and the outer diameter decreases from the first axial end to the second axial end of the tubular pipe.

3. The broadband resonator according to claim 1, wherein the tubular pipe has a cross-section taken in a radial direction relative to the central axis in which the circumferential outer wall of the tubular pipe includes a bumped-out section in which circumferential outer wall protrudes further radially outwardly than in other portions of the tubular pipe cross-section;
wherein the bumped-out section is configured to provide space to align and position a sensing element of the air flow sensor in a desired position within the gas flow duct.

4. The broadband resonator according to claim 1, wherein the resonator insert includes a rotational alignment locking structure configured to engage with the resonator casing and limit rotation of the resonator insert in the resonator casing, to enforce a desired rotational alignment of the resonator insert in the resonator casing;
wherein the rotational alignment locking structure include an indentation formed into a radially outer edge of at least one of the plurality of annular disk-shaped walls, the indentation configured to engage a projection feature of the resonator casing.

5. The broadband resonator according to claim 4, wherein the rotational alignment locking structure further includes two axially projecting walls, spaced apart circumferentially adjacent to opposite side of the indentation, the two axially projecting walls projecting axially outwardly from and extending on the at least one of the plurality of annular disk-shaped walls, in a direction away from the indention and towards the circumferential outer wall of the tubular pipe;

wherein the two axially projecting walls are configured for contact against the projection feature of the resonator casing to enforce a desired rotational alignment of the resonator insert in the resonator casing.

6. The broadband resonator according to claim 1, wherein the resonator insert further includes at least one snap locking tab formed on and arranged proximate to a radially outer edge of the bell mouth;

wherein the at least one snap locking tab includes an engagement opening configured to receive a snap projection formed on an interior of the resonator casing to lock the resonator insert in an installed position within the resonator casing.

7. The broadband resonator according to claim 1, wherein the first one of the plurality of disk-shaped annular walls includes a rib structure formed on the first one of the plurality of disk-shaped annular walls, the rib structure configured to carry radially compressive clamp loading.

8. The broadband resonator according to claim 1, wherein the radially outward projecting circumferential outer wall surrounding the air flow sensor opening extends through at least one of the annular disk-shaped walls.

9. A resonator insert configured for installation into an interior of a resonator casing, the resonator insert comprising:

a tubular pipe elongated along a central axis from a first axial end to a second axial end of the broadband resonator insert, the tubular pipe having a circumferential outer wall having a plurality of plurality of perforation holes spaced apart and extending radially through the circumferential outer wall, wherein an interior of the tubular pipe forms a gas flow duct for guiding a gas flow through the broadband resonator from the first axial end to the second axial end;

a plurality of annular disk-shaped walls provided on and projecting radially outwardly from the circumferential outer wall of the tubular pipe, adjacent annular disk-shaped walls spaced axially part from each other to define resonator chambers therebetween;

wherein a first one of the plurality of the annular disk-shaped walls is arranged proximate to the first axial end of the resonator insert;

wherein a bell-mouth is formed at the second axial end of the tubular pipe, the bell-mouth flared radially outwardly wherein the resonator insert includes a rotational alignment locking structure configured to engage with the resonator casing to enforce a desired rotational alignment of the resonator insert in the resonator casing; wherein the rotational alignment locking structure includes an indentation formed into a radially outer edge of at least one of the plurality of annular disk-shaped walls, the indentation configured to engage a projection feature of the resonator casing; wherein the rotational alignment locking structure further includes two axially projecting walls, spaced apart circumferentially adjacent to opposite side of the indentation, the two axially projecting walls projecting axially outwardly from and extending on the at least one of the plurality of annular disk-shaped walls, in a direction away from the indention and towards the circumferential outer wall of the tubular pipe; wherein the two axially projecting walls are configured for contact against the projection feature of the resonator casing to enforce a desired rotational alignment of the resonator insert in the resonator casing.

10. The resonator insert according to claim 9, wherein the plurality of annular disk-shaped walls each have a different radially outer diameter;

wherein the plurality of annular disk-shaped walls are spaced apart axially on the circumferential outer wall of the tubular pipe;

wherein the plurality of annular disk-shaped walls each have an outer diameter, and the outer diameter decreases from the first axial end to the second axial end of the tubular pipe.

11. The resonator insert according to claim 9, wherein the resonator insert further includes an air flow sensor opening extending through the circumferential outer wall of the tubular pipe, the air flow sensor opening configured to receive a mass air flow sensor through the air flow sensor opening and projecting into the gas flow duct in the interior of the tubular pipe.

12. The resonator insert according to claim 11, wherein wherein the tubular pipe has a cross-section taken in a radial direction relative to the central axis in which the circumferential outer wall of the tubular pipe includes a bumped-out section in which the circumferential outer wall protrudes further radially outwardly than in other portions of the tubular pipe cross-section;

wherein the bumped-out section is configured to provide space to position a sensing element of the air flow sensor in the gas flow duct.

13. The resonator insert according to claim 9, wherein the resonator insert further includes at least one snap locking tab formed on and arranged proximate to a radially outer edge of the bell mouth;

wherein the at least one snap locking tab includes an engagement opening configured to receive a snap projection formed on an interior of the resonator casing to lock the resonator insert in an installed position within the resonator casing.

14. The resonator insert according to claim 9, wherein the first one of the plurality of disk-shaped annular walls includes a rib structure formed on the first one of the plurality of disk-shaped annular walls, the rib structure configured to carry radially compressive clamp loading.

* * * * *